(12) United States Patent
Cheng et al.

(10) Patent No.: US 7,003,109 B2
(45) Date of Patent: Feb. 21, 2006

(54) COMPACT CRYPTO-ENGINE FOR RANDOM NUMBER AND STREAM CIPHER GENERATION

(75) Inventors: Lee Ming Cheng, Hong Kong (HK); Chi Kwong Chan, Hong Kong (HK); Choi Kuen Chan, Hong Kong (HK)

(73) Assignee: City University of Hong Kong, Kowloon (KR)

( * ) Notice: Subject to any disclaimer, the term of this patent is extended or adjusted under 35 U.S.C. 154(b) by 861 days.

(21) Appl. No.: 09/837,981

(22) Filed: Apr. 19, 2001

(65) Prior Publication Data

US 2003/0161467 A1    Aug. 28, 2003

(51) Int. Cl.
*H04L 9/00* (2006.01)
(52) U.S. Cl. .......................... 380/44; 380/47
(58) Field of Classification Search .............. 380/44, 380/46, 268, 37, 43, 45, 47; 375/377
See application file for complete search history.

(56) References Cited

U.S. PATENT DOCUMENTS

| 4,316,055 | A | | 2/1982 | Feistel | |
|---|---|---|---|---|---|
| 5,216,750 | A | * | 6/1993 | Smith | 706/18 |
| 5,297,207 | A | * | 3/1994 | Degele | 380/46 |
| 5,307,412 | A | * | 4/1994 | Vobach | 380/42 |
| 6,148,053 | A | * | 11/2000 | Ozluturk | 375/377 |
| 6,252,958 | B1 | * | 6/2001 | Rose | 380/28 |
| 6,351,539 | B1 | * | 2/2002 | Djakovic | 380/268 |

FOREIGN PATENT DOCUMENTS

WO    WO 00/46954    8/2000

* cited by examiner

*Primary Examiner*—Hosuk Song
*Assistant Examiner*—Thanhnga Truong
(74) *Attorney, Agent, or Firm*—Jackson Walker, LLP

(57) ABSTRACT

A compact dual function Random Number Generator and Stream Cipher Generator includes a Crypto-engine has a controller for controlling the engine to operate in one or other of its functions. The Crypto-engine incorporates a plurality of clipped Hopfield Neural Network pairs.

10 Claims, 6 Drawing Sheets

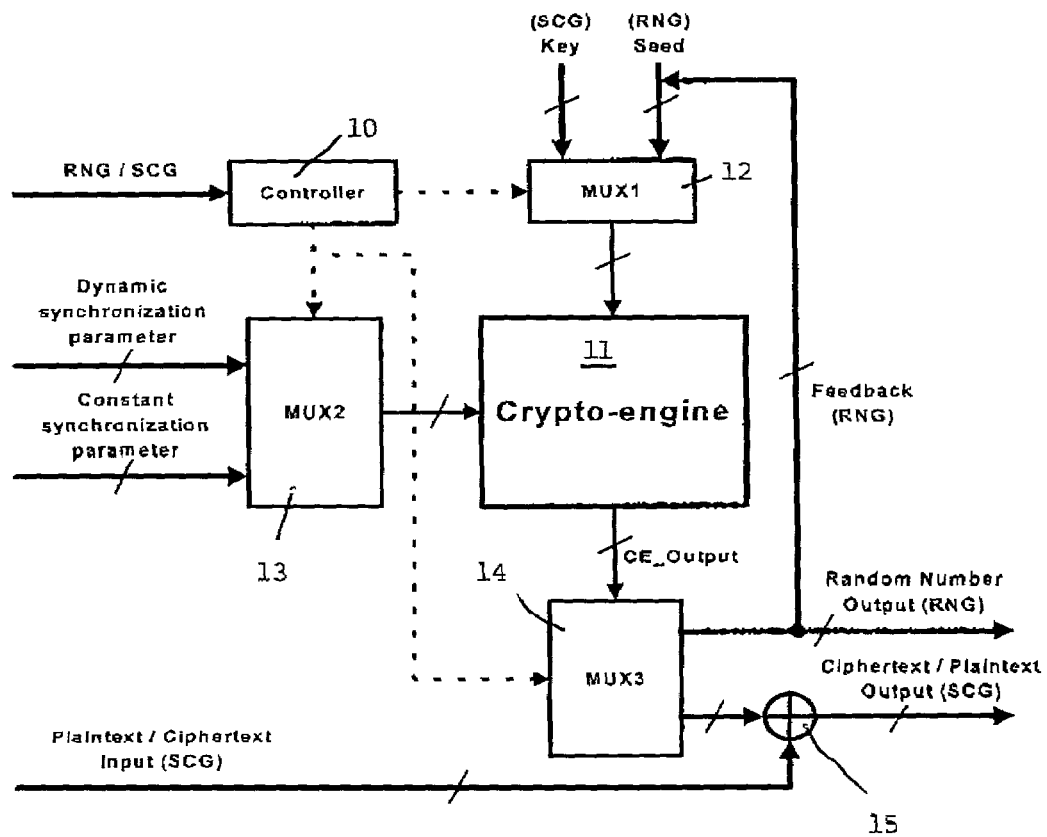
Figure 1
- - - - - Control Signal
———/——— Bundled Input / Output Data
 XOR Function $w_{ij}$ : Synaptic Weight from neuron $i$ to neruon $j$
$x_i$ : Input
$y_i$ : Output

TABLE 1

Figure 4

TABLE 2

The permutation matrix mapped the original (0,1,2,3,4,5,6,7) row into permuted (4,7,2,1,6,0,3,5) row.

Figure 5

| Statistical test | Required interval | Output $X_{out}$ | Result |
|---|---|---|---|
| Monobit test | $9654 < X < 10346$ | 10036 | Pass |
| Poker test | $1.03 < X < 57.4$ | 6.1576 | Pass |
| Runs test | Run = 1, $2267 \leq X \leq 2733$ | 2505 | Pass |
| | Run = 2, $1079 \leq X \leq 1421$ | 1227 | Pass |
| | Run = 3, $502 \leq X \leq 748$ | 616 | Pass |
| | Run = 4, $223 \leq X \leq 402$ | 303 | Pass |
| | Run = 5, $90 \leq X \leq 223$ | 176 | Pass |
| | Run $\geq$ 6, $90 \leq X \leq 223$ | 177 | Pass |
| Long run test | Run $\geq$ 34, $X = 0$ | 0 | Pass |

Table 3

Figure 6

| Statistical test | Required interval | Output $X_{out}$ | Result |
|---|---|---|---|
| Monobit test | $9654 < X < 10346$ | 10073 | Pass |
| Poker test | $1.03 < X < 57.4$ | 5.5616 | Pass |
| Runs test | Run = 1, $2267 \leq X \leq 2733$ | 2464 | Pass |
| | Run = 2, $1079 \leq X \leq 1421$ | 1258 | Pass |
| | Run = 3, $502 \leq X \leq 748$ | 629 | Pass |
| | Run = 4, $223 \leq X \leq 402$ | 353 | Pass |
| | Run = 5, $90 \leq X \leq 223$ | 157 | Pass |
| | Run $\geq$ 6, $90 \leq X \leq 223$ | 143 | Pass |
| Long run test | Run $\geq$ 34, $X = 0$ | 0 | Pass |

Table 4

Figure 7

COMPACT CRYPTO-ENGINE FOR RANDOM NUMBER AND STREAM CIPHER GENERATION

BACKGROUND OF THE INVENTION

1. Field of the Intention

The invention relates to a Crypto-engine for authentication and information data scrambling.

2. Description of Prior Art

The security of many cryptographic systems depends upon the generation of unpredictable quantities that must be of sufficient size and random. Linear feedback shift registers (LFSRs), due to their simplicity and efficiency of implementation, are the basic building blocks in most popular used stream cipher generators. However, some attractive properties associated with LFSRs give rise to the failure of many of these constructions to meet a good cryptographic strength. In particular, the inherent linearity of LFSRs and the algebraic structure are frequently the basis for breaking these cryptographic systems. The generating polynomial can easily be derived and the initial states that generate a specific sequence will produce a number of predictable sequences. To avoid this linearity problem, a nonlinear filtering function, whose inputs are taken from some shift register stages to produce an output, is used to destroy the linearity and algebraic structure of the original sequence. The non-linear filter in the form of nonlinear combination generator is essential to make the outcomes more secure. However, most of these filters are designed based on a nonlinear combining function f of the outputs of several LFSRs in parallel. The nonlinear function f employed is a fixed function. Therefore, the mapping defined by the nonlinear function f is a one-to-one mapping, and for the same input imposed on f, the same output will be obtained. Such a generator suffers a divide-and-conquer attack if a correlation exists between the keystream and the output sequences of individual sub-generators. One solution could be to use the Data Encryption Standard (DES) to randomize the output but this is not economical as a substantial amount of hardware is required. Generally stated, problems arise because the stream ciphers or random number generators based on LFSRs are cryptographically unsafe and a substantial amount of hardware has to be used to make it safe.

SUMMARY OF THE INVENTION

It is an object of the invention to overcome or at least reduce the above problems.

According to the invention there is provided a compact dual function Random Number Generator (RNG) and Stream Cipher Generator (SCG) including a Crypto-engine and a controller for controlling the Crypto-engine to operate either as a RNG or a SCG, three multiplexers controlled by the controller to supply signals selectively to and receive signals from the Crypto-engine, in which a first multiplexer is arranged to receive RNG seed signals or SCG key signals, a second multiplexer is arranged to receive dynamic synchronization parameter signals or constant synchronization signals, and a third multiplexer is arranged to receive signals from the Crypto-engine and provide Random Number output signals or Stream Cipher output signals, respectively in each case.

An XOR gate may be provided and arranged to receive the Stream Cipher output signals from the third multiplexer and separate Stream Cipher signals in plaintext or ciphertext, such that the output of the XOR gate is in ciphertext or plaintext, respectively.

A plurality of clipped Hopfield Neural Network pairs may be provided in the dual function Generator.

A Seed/Key input; a Synchronization Parameter Input; a Seed/Key Randomizer and a Non-Linear Manipulator may be included.

The clipped Hopfield Neural Network pairs may have an Input CHNN (ICHNN) that provides a nonlinear interaction with a dynamic/constant Synchronization Parameter input and an output CHNN (OCHNN) then provides nonlinear interaction with an adjacent ICHNN output.

The clipped Hopfield Neural Network may include one of a single iterating CHNN pair and a k pipeline CHNN pair, a Decision Box (DEC) and an Attractor Mapping Table (AMT).

The clipped Hopfield Neural Network may include neurons in two states {0,1}; Synaptic Weights in three states {−1,0,1}; and a non-linear Activation Function {0.1}.

An input to a n-neuron clipped Hopfield Neural Network may be arranged to converge to one of the 2n+1 stable states or attractors of the network after finite steps of iterations k.

The clipped Hopfield Neural Network may be constructed using cascaded Lookup Tables if n is small. The Lookup Tables may be associated with an initial Synaptic Weight Matrix and a random selected Permutated Synaptic Weight Matrix.

The compact dual function may include a "toggle" feature in some selected bit sequence combination to avoid statistical bias and possible correlation attack.

BRIEF DESCRIPTION OF THE DRAWINGS

A Compact dual function Crypto-engine for Random Number and Stream Cipher Generation will now be described by way of example with reference to the accompanying drawing in which:

FIG. 1 is a block diagram of the Compact dual function Random Number Generator and Stream Cipher Generator;

FIG. 4 is table 1 which illustrates the initial convergent domains for the Clipped Hopfield Neural Network with 8 Neurons;

FIG. 5 is table 2 which illustrates the permuted convergent domains for the Clipped Hopfield Neural Network with 8 Neurons;

FIG. 6 is table 3 which illustrates the statistical test results satisfying FIPS 140-2 using a constant synchronization input in MUX2 and FIG. 7 is table 4 which illustrates the statistical test results satisfying FIPS 140-2 using a dynamic synchronization input in MUX2;

DESCRIPTION OF THE PREFERRED EMBODIMENTS

Figure 2:
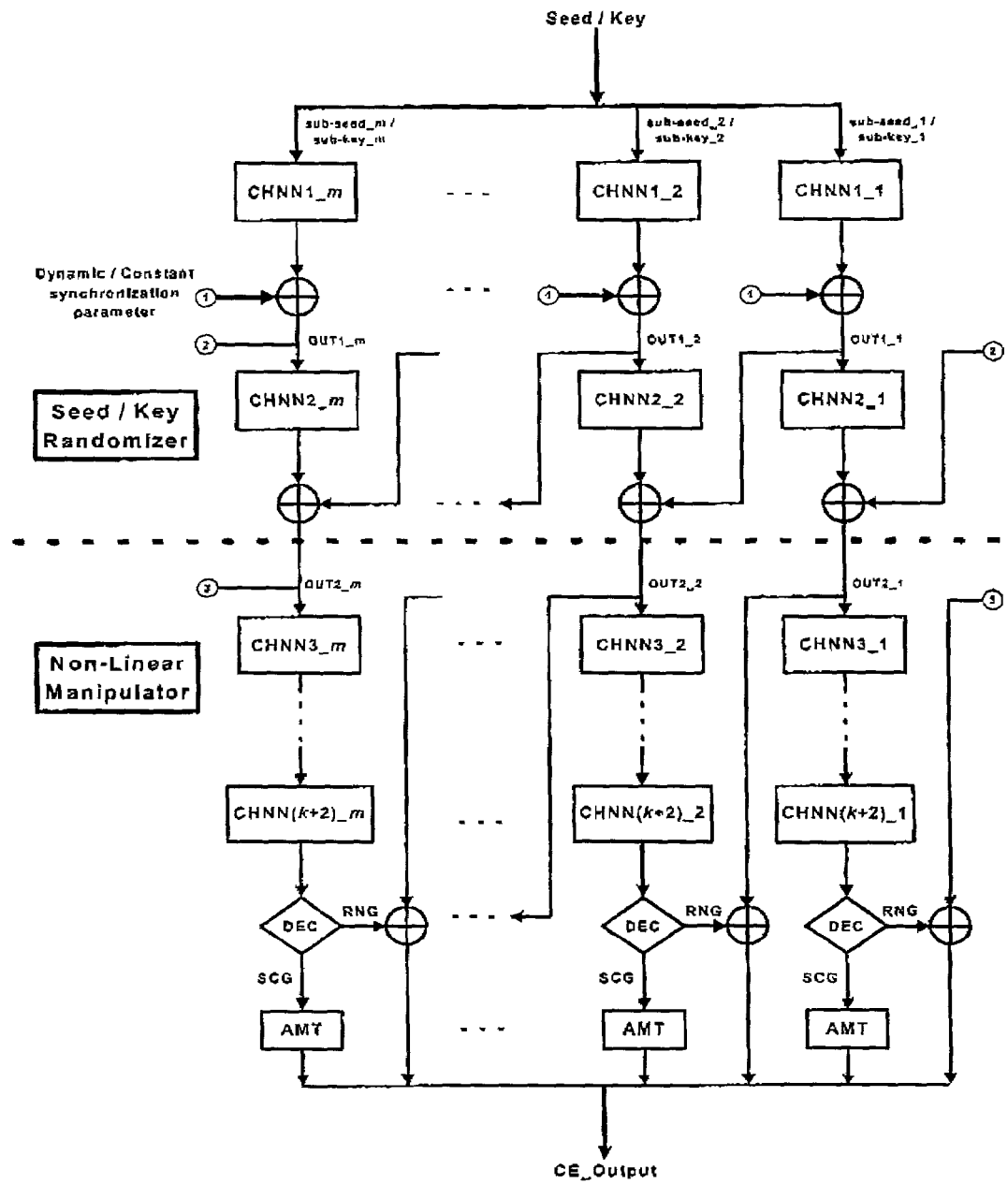
FIG. 2 illustrates the structure of the Crypto-engine.

Embodiment of the present invention provide a dual function Compact Crypto-engine that is capable of generating any length of random sequence when the Crypto-engine is configured or used in the form of a Random Number Generator (RNG), and enables any length of data to be encrypted when the Crypto-engine is configured or used in the form of Stream Cipher Generator (SCG). Previously, a same Crypto-engine (known per se) was incapable of being configured or used in both forms.

Referring to the drawings, in FIG. 1 the block diagram represents the basic structure. A Controller 10 is used to control the operation of the Crypto-engine 11 whether it is used in the form of a RNG or a SCG. A multiplexer MUX1 12 selects the "seed" for the RNG or the "key" for the SCG respectively as the initial input to the Crypto-engine. A multiplexer MUX2 13 selects two external inputs: dynamic or constant synchronization parameters. The dynamic parameter can be a variable address location or a changing real time clock. The constant synchronization parameter can be an additional key or any fixed parameter. A multiplexer MUX3 14 selects whether the output from the Crypto-engine is from the RNG or the SCG. The output from the RNG can be fed back to the input and becomes the new "seed" for the next random number state. The output from the SCG can be the ciphertext after encryption, or the plaintext after decryption using an XOR gate 15.

FIG. 2 shows a fundamental building block of the Crypto-engine. The upper part of the Figure comprises clipped Hopfield Neural Networks.

Figure 3:
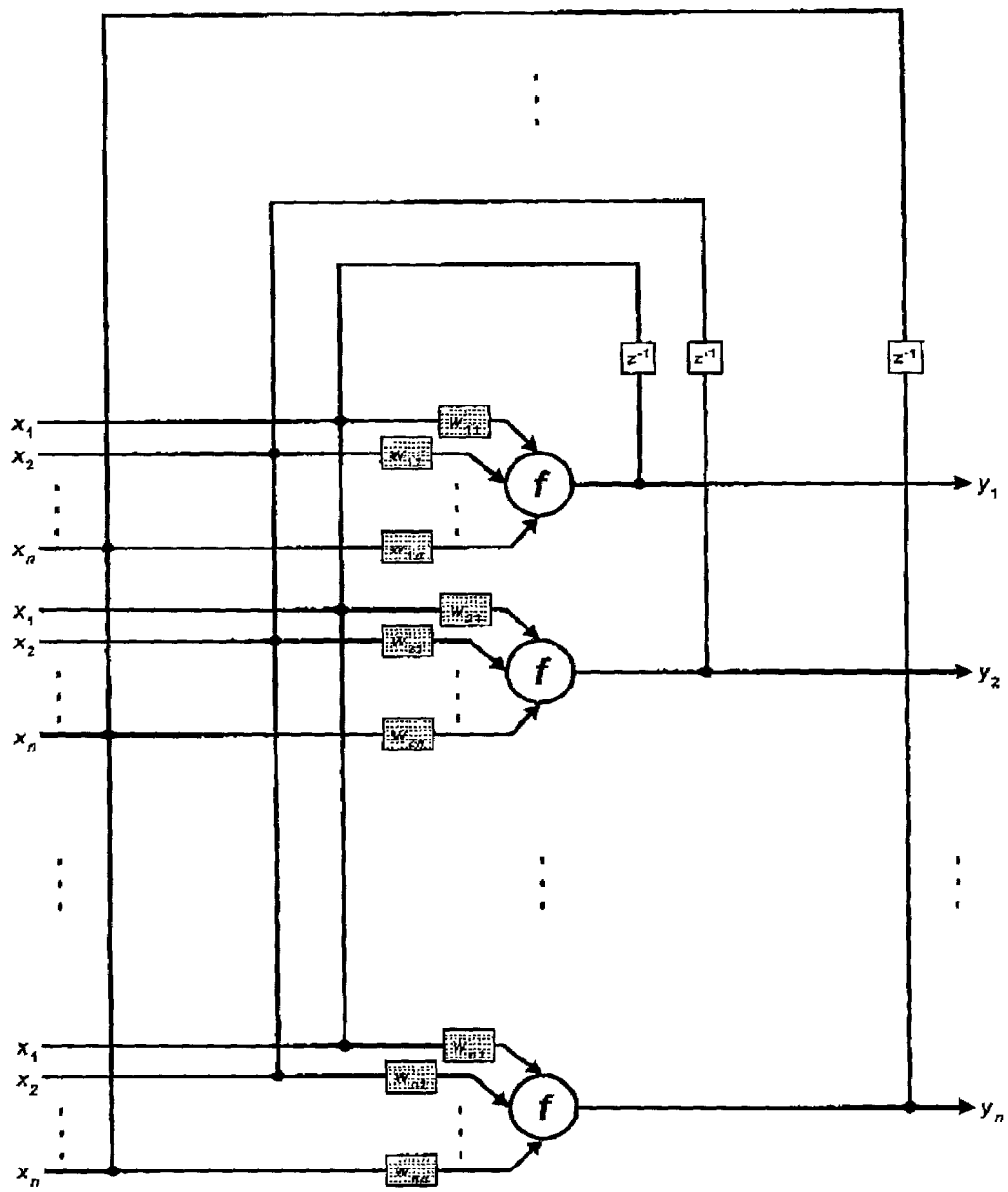
FIG. 3 is a block diagram of a Clipped Hopfield Neural Network.

A secret and random seed/key is first divided into m sub-seed/sub-key, where m is referred to the number of CHNNs cascaded in parallel. The CHNNs, each with n neurons, are used. FIG. 3 shows the schematic structure of the CHNN with n neurons. The boxes labeled $z^{-1}$ represent unit delays. Each neuron is in one of the two states $\{0, 1\}$. Pairs of neurons i and j in the network are connected by a Synaptic Weight $w_{ij}$.

As shown in FIG. 3, the output of each neuron in the CHNN is fed back to all other neurons including itself. For the CHNN in the described embodiment, the actions between two neurons can be excitatory (i.e. $w_{ij}=1$), inhibitory (i.e. $w_{ij}=-1$) or not directly connected (i.e. $w_{ij}=0$). The Synaptic Weight Matrix of the CHNN is clipped to three values $\{0, 1, -1\}$.

The CHNN with n neurons takes n bite input x and n bits output y, according to the following equation:

$$yi = f\left(\sum_{j=0}^{n-1} wijxj\right) \text{ for } i = 0, 1, \ldots, n-1 \quad (1)$$

where f is a non-linear function in the form of a Sign Function, i.e. $f(\sigma)=1$ when $\sigma \geq 0$ and $f(\sigma)=0$ when $\sigma<0$.

The input to the CHNN will converge to one of the stable states or the attractors of the network after finite steps of iterations k. For a CHNN with n neurons, most of the inputs to the network will converge to one of the 2n+1 stable states after approximately k steps of iterations. For n=8, there will be 17 stable states and the iteration is 2, i.e. after passing through 2 consecutive CHNNs the stable state is reached.

The Crypto-engine (FIG. 2) consists of a Seed/Key Randomizer and a Non-Linear Manipulator. In the Seed/Key Randomizer, each sub-seed/sub-key with n bits firstly pass through a CHNN layer with n neurons.

The circuit is based on a standard Hopfield Neural network that is 'clipped' as described below. A 'clipped' Hopfield Neural Network has already been proposed for use in other cryptographic systems but not applied in support of a dual function Crypto-engine as provided in embodiments of the present invention. The outputs from CHNN1_1 to CHNN1_m are XORed with the synchronization input. These outputs, from OUT1_1 to OUT1_m, become the input of CHNN2_1 to CHN2_m respectively. By further XOR operations, OUT2_1 to OUT2_m are generated and will be passed into the Non-Linear Manipulator (NLM). The NLM is constructed using a k consecutive CHNN or a single CHNN iterated k times to reach a stable state.

Figure 4:
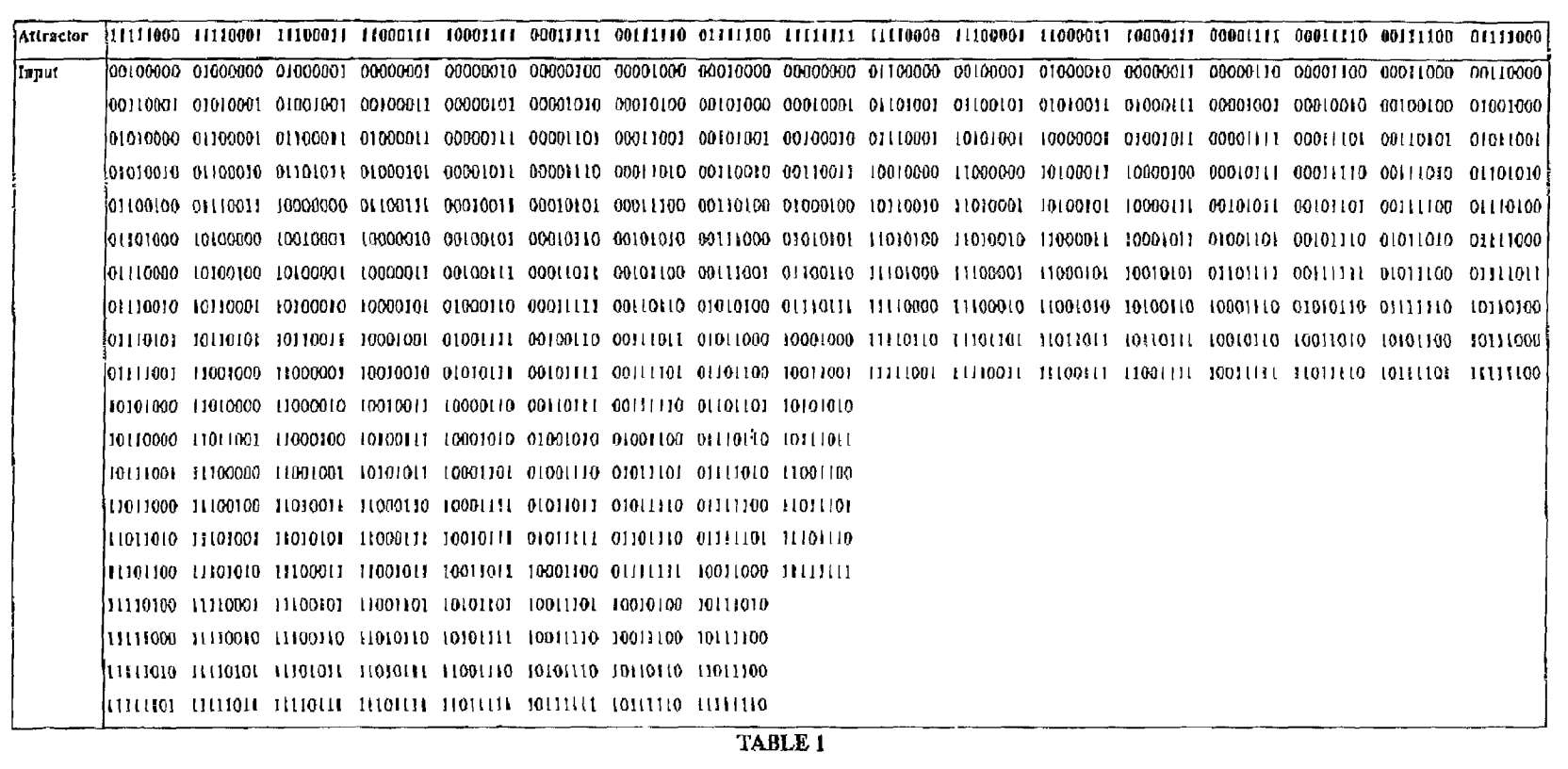

The CHNN may be constructed in another way using a lookup table if n is small, say 16. By performing a random selected n×n Permutation Matrix on the Synaptic Weight Matrix, a different attractor and input pair will result. Table 1 and Table 2 (FIGS. 4 and 5) show the convergence domain of the attractors with two different Synaptic Weight Matrix in CHNNs with 8 neurons. From the tables, the Crypto-engine has generated an irregular relationship between the inputs to the CHNN and the output attractors.

Block DEC (in FIG. 2) is a decision box to select whether the Crypto-engine is operated as a RNG or a SCG. For a RNG, a further XOR function is required and the final random sequence output is fed back to become the new seed for the next random number state. For a SCG, an Attractor Mapping Table (AMT) is used to map n bits of the attractors into 1 bits sequences, where $1 \leq n$. The outputs from each AMT are combined together to form a keystream which is XORed with the plaintext/ciphertext to form the encrypted/decrypted data, respectively.

To avoid statistical bias and possible correlation attack, some selected bit sequence combination can be designed to have a "toggle" feature, i.e. the same sequence appears consecutively with a complimentary output.

With the use of the Permutation Matrix to generate different Synaptic Weight Matrix, a different keystream can be obtained even though the same "key" and "synchronization input" are used. Moreover, with the nonlinear dynamic property of the CHNN, the following properties will occur under different keystreams: different ciphertext may be generated from the same plaintext; same ciphertext may be generated from different plaintext; or different plaintext may give rise to different ciphertext. Thus, the scheme is safeguarded against cryptanalyst's ciphertext only attack. Moreover, neither a chosen plaintext attack nor a known plaintext attack can guess the secret "keys".

The random number generated from the RNG and the keystream generated from the SCG satisfy some degree of randomness to ensure that it can be used in a cryptographic process. The statistical tests as specified in FIPS 140-2 for randomness tests have been considered. These statistical tests are commonly used for determining whether the binary sequence possesses some specific characteristics that a truly random sequence would be likely to exhibit. The following properties of the bit stream are satisfied; distribution of single bit (monobit test), the number of occurrences of each of the 16 possible 4-bit combinations (poker test), the consecutive occurrence of 1's or 0's (runs test), and the maximum consecutive occurrence (long run test). Failure of a single bit stream of 20,000 consecutive bits subjected to each of the above tests would indicate higher possibilities of being statistically attacked.

Table 3 (in FIG. 6) are the test results for the random number generated (RNG) using a constant synchronization input.

Table 4 (in FIG. 7) are the test results for the keystream generated (SCG) using a dynamic synchronization input. Both results show that the sequence has a good statistical property and satisfies all of the tests. The output value $x_{out}$ remained within acceptable limits for the sequences, generated with different seeds/keys and different Synaptic Weight Matrices.

In embodiments of the present invention, both random number generation and stream cipher encryption can be implemented using the same software or hardware module. This results in a considerable saving in hardware components, memory space and design time. This is especially important in providing applications in markets with constrained resources, such as use with smart cards. Embodiments of the invention are entirely suitable for constrained silicon implementation, such as smart card key generation and data scrambling, and a large re-configurable Random Number Generator and Stream Cipher Generator.

Embodiments of the invention can be implemented in a parallel cascaded architecture. The structures require simple Exclusive Or and Logic functions. This allows fast and efficient implementation of the dual function Crypto-engine using either software or hardware techniques. With the use of a synchronization input, the matching of computational output results are retained and are as good as external located devices of the same type.

We claim:

1. A compact dual function random number generator and stream cipher generator comprising:
   a crypto-engine operable as either a random number generator or a stream cipher generator, and
   a controller controlling the crypto-engine to operate either as the random number generator or the stream cipher generator, including three multiplexers controlled by the controller to supply signals selectively to and receive signals from the crypto-engine, in which a first multiplexer is arranged to receive a random number generator seed signal and a stream cipher generator key signal, a second multiplexer is arranged to receive a dynamic synchronization signal and a constant synchronization signal, and a third multiplexer is arranged to receive an output signal from the crypto-engine and provide a random number output or a stream cipher output, respectively in each case.

2. The compact dual function random number generator and stream cipher generator of claim 1, further including an XOR gate arranged to receive the stream cipher output from the third multiplexer and separate the stream cipher output into plaintext or ciphertext, such that the output of the XOR gate is in ciphertext or plaintext, respectively.

3. A dual function generator comprising:
   a crypto-engine operable as either a random number generator or a stream cipher generator, including a randomizer and a non-linear manipulator in series, the randomizer having a plurality of clipped hopfield neural network pairs and the non-linear manipulator having at least one corresponding clipped hopfield neural network, and
   a controller controlling the crypto-engine to operate either as the random number generator or the stream cipher generator, including three multiplexers controlled by the controller to supply signals selectively to and receive signals from the crypto-engine, in which a first multiplexer is arranged to receive a random number generator seed signal and a stream cipher generator key signal, a second multiplexer is arranged to receive a dynamic synchronization signal and a constant synchronization signal, and a third multiplexer is arranged to receive an output signal from the crypto-engine and provide a random number output or a stream cipher output, respectively in each case.

4. The dual function generator of claim 3 in which the clipped hopfield neural network (CHNN) pairs comprises an input CHNN and a output CHNN and in which the input CHNN provides a nonlinear interaction with the dynamic or constant synchronization signal and the output CHNN provides a nonlinear interaction with an adjacent input CHNN output.

5. The dual function generator of claim 3 in which the clipped hopfield neural networks include neurons in one of two states; synaptic weights in one of three states; and a non-linear sign function.

6. The dual function generator of claim 3 in which an input to each clipped hopfield neural network pair is arranged to converge to one of 2n +1 stable states or attractors of the network after finite steps of iterations k.

7. The dual function generator of claim 3 in which the clipped hopfield neural network is constructed using cascaded lookup tables of different attractor and input pairs.

8. The dual function generator of claim 7 in which the lookup tables are associated with an initial synaptic weight matrix or a random selected permutated synaptic weight Matrix.

9. The dual function generator of claim 3 including a decision box for selecting whether the dual function generator is operating as a random number generator or a stream cipher generator and an attractor mapping table connected to the decision box for providing encrypted/decrypted data when the dual function generator is operating as a stream cipher generator.

10. The dual function generator of claim 5 in which the neurons states are 0 and 1; the synaptic weights states are −1, 0, and 1; and the non-linear sign function is 0, and 1.

* * * * *